No. 790,175.                                                    Patented May 16, 1905.

UNITED STATES PATENT OFFICE.

ARTHUR HJALMAR BORGSTRÖM, OF HANGÖ, RUSSIA.

ART OF RESTORING HARD-FROZEN CREAM TO ITS INITIAL CONDITION.

SPECIFICATION forming part of Letters Patent No. 790,175, dated May 16, 1905.

Application filed December 2, 1903. Serial No. 183,479.

*To all whom it may concern:*

Be it known that I, ARTHUR HJALMAR BORGSTRÖM, a subject of the Archduke of Finland, and a resident of Hangö, in the Archduchy of Finland, Russia, have invented certain new and useful Improvements in the Art of Restoring Hard-Frozen Cream to its Initial Condition, of which the following is a specification.

For preserving cream for a long time, especially for the transportation of the same, it is brought into frozen condition. For obtaining butter free from defects in consistency and color from cream treated in the said manner it must, however, be observed that the cream is only slightly frozen, forming a semi-frozen paste-like mass, as if the cream is hard-frozen the butter made from the same according to methods hitherto employed will easily become "granular," "gritty," "mottled," or its consistency or color will be defective in other respects, owing to the following reasons: In ordinary unfrozen milk or cream fatty substances are, as well known, distributed as globules in the milk-serum, the said fatty substances forming, together with the latter, an emulson which is not changed when moderately heated. In hard-frozen cream, on the other hand, fatty substances will partly separate, owing to the hard-freezing process, from the emulsion when heated and rise to the surface. During the subsequent churning process, which, as known, is effected at a temperature lower than the coagulating temperature of the fatty substances, fatty substances separated will coagulate too early and cause the said defects of the butter.

According to my invention the said disadvantage is avoided by bringing back or restoring hard-frozen cream to the condition in which it was before the freezing process. This is effected by an emulsifying operation in the manner stated below, fatty substances separated during the freezing process being thereby again divided in globules in the other liquid and forming, together with the same, a homogeneous emulsion which can be heated without fatty substances being separated and has all the qualities of cream that has not been subjected to freezing. The said emulsifying operation may be effected by forcing the thawed cream at a temperature higher than the coagulating temperature of the butter-fat and at great pressure through one or more narrow openings or slits. Such an operation causes the fatty substances to be finely distributed in the other liquid. The said emulsifying operation may be effected also by leaving the cream for some time and skimming off the upper layer. Fatty substances skimmed off in the said manner are then forced into the remaining portion of the cream through one or more narrow openings at great pressure and at a temperature higher than the coagulating temperature of the butter-fat. By combining in the said manner an emulsifying operation with the treatment of hard-frozen cream into butter butter may be produced from the cream which is substantially free from defects in consistency and color and has as good and perfect a quality as butter made from slightly-frozen cream or cream not subjected to the freezing process.

Among advantages gained by treating cream in the manner stated above may be mentioned that cream which is to be stored or transported may be frozen to any temperature, special arrangements consequently not being necessary for keeping the cream at suitable temperature, as in the case in storing or transporting cream only slightly frozen, which arrangements obviously make the storing or transportation considerably more expensive and difficult. Thus it will be seen that through my invention among other advantages gained thereby the cream-transportation expenses are reduced and its storing is facilitated.

Having now described my invention, what I claim as new, and desire to secure by Letters Patent, is—

1. The herein-described art of restoring hard-frozen cream to the condition in which it was before the freezing process, for the manufacturing of butter free from defect in consistency and color, which consists in thawing the cream and dividing fatty substances separated during the freezing process into the remaining liquid through an emulsifying operation.

2. The herein-described art of restoring hard-frozen cream to the condition in which it was before the freezing process, for the manufacturing of butter free from defect in consistency and color, which consists in thawing the cream and forcing the entire thawed cream mass, at a temperature higher than the coagulating temperature of the butter-fat, through one or more narrow openings.

In witness whereof I have hereunto signed my name in the presence of two subscribing witnesses.

ARTHUR HJALMAR BORGSTRÖM.

Witnesses:
 T. BEHM,
 OSCAR SANDSTROM.